July 5, 1966   F. A. GROTH ETAL   3,258,813
PRESSURE FORMING OF PLASTIC FILM
Filed Jan. 28, 1963   2 Sheets-Sheet 1

INVENTORS
Fred A. Groth
Paul Meisner
BY
Ooms, McDougall & Hersh
Attorneys

July 5, 1966   F. A. GROTH ETAL   3,258,813
PRESSURE FORMING OF PLASTIC FILM
Filed Jan. 28, 1963   2 Sheets-Sheet 2

INVENTORS
Fred A. Groth
Paul Meisner
BY
Ooms, McDougall & Hersh
Attorneys

United States Patent Office 3,258,813
Patented July 5, 1966

3,258,813
PRESSURE FORMING OF PLASTIC FILM
Fred A. Groth, Chicago, and Paul Meisner, Park Forest, Ill., assignors, by mesne assignments, to Dynamics Corporation of America, a corporation of New York
Filed Jan. 28, 1963, Ser. No. 254,320
8 Claims. (Cl. 18—19)

The present invention relates to an apparatus and method for the pressure forming of plastic film.

There are a wide variety of applications which provide for the use of plastic articles formed in various shapes. Since one of the major factors in the wide use of plastic is the low cost thereof, it is important to provide means for forming the plastic which do not unnecessarily add to the cost. This is a situation which is particularly true in the packaging industry and in related fields where the articles formed are to be discarded after a single use.

It is also necessary to provide for the forming of articles which are sufficiently strong to withstand the stresses arising in the normal course of their use. Again, the packaging industry serves as an example since, in this case, plastic packages formed must be suitable for retaining goods without the danger of loss of the goods through damage to the package under normal handling conditions. In many instances, it has been found that it is necessary to employ unnecessarily large amounts of plastic material in order to provide the necessary strength in areas subjected to relatively high stress. This factor is, of course, objectionable where the cost of the plastic article is to be kept low.

It is an object of this invention to provide means for forming plastic film which enables the efficient and economical production of plastic articles.

It is an additional object of this invention to provide a means for the forming of plastic articles which is capable of eliminating the tendency toward the formation of structurally weak points in the articles whereby suitable articles can be formed without the necessity for the use of particularly large amounts of plastic material.

These and other objects of this invention will appear hereinafter and for purposes of illustration but not of limitation specific embodiments of this invention are shown in the accompanying drawings in which.

Figure 1:
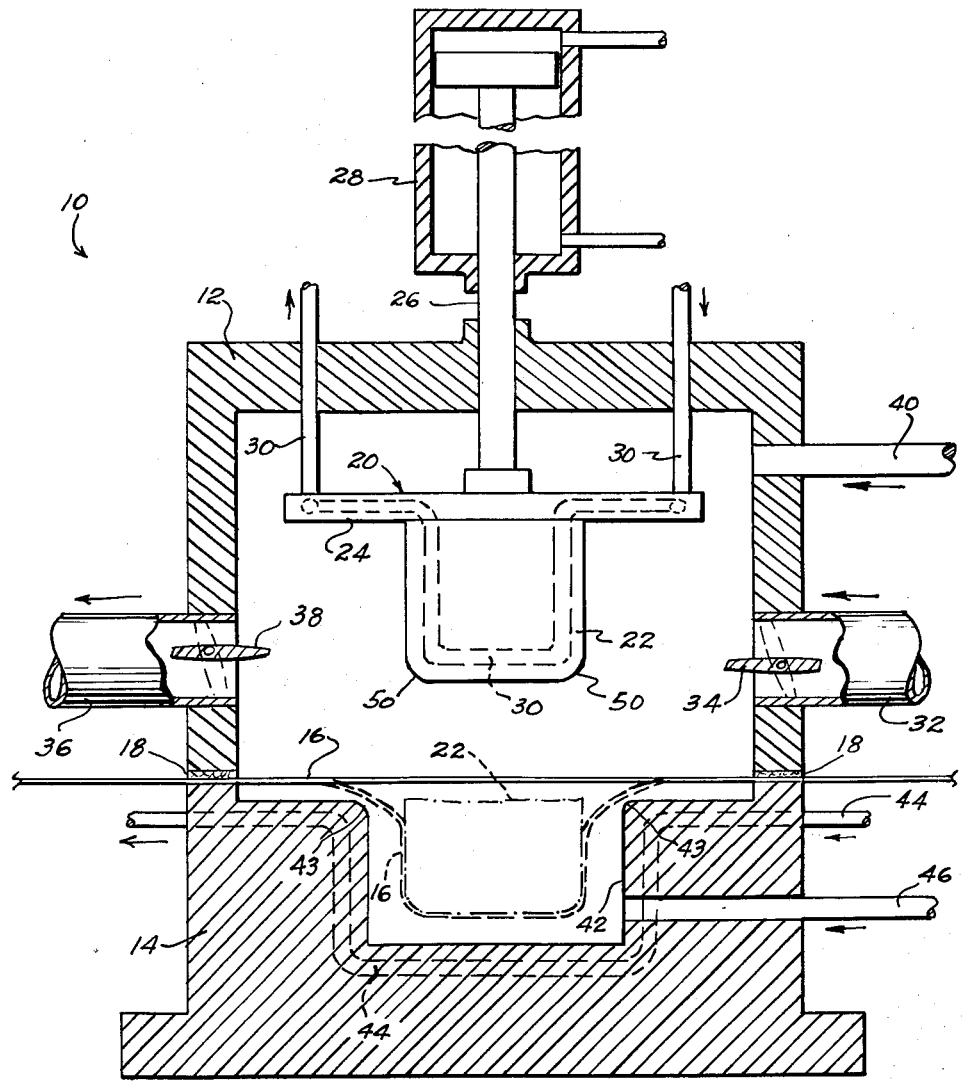
FIGURE 1 is an elevational view in section of an apparatus characterized by the features of this invention.

In accordance with the general concepts of this invention, plastic articles are formed from film stock with the use of an apparatus which includes upper and lower sections. The film is introduced between these sections and means are provided for then heating the film to thereby reduce it to a formable condition. A plug assist means is then provided for engaging the film and disposing the film in the cavity which is to provide the desired final configuration of the film.

When disposed within the cavity by the plug assist means described, the plastic film is held in spaced-apart relation with respect to the walls of this cavity. At this time, pressure is introduced over the plastic film whereby it is pressed tightly against the surfaces of the cavity thereby forming the desired configuration. As will appear, the design of the elements employed in the construction provides for the maximum utilization of the plastic available for forming of the final product. Furthermore, the structure of this invention provides for formation of the plastic in a manner such that areas subjected to relatively high stress in use will be stronger and will more readily resist damage due to such stress.

A specific example of a construction capable of achieving the objects of this invention is illustrated in the accompanying drawings. The plastic film forming mechanism 10 includes an upper section 12 and a lower section 14. These sections are adapted to be separated by means (not shown) whereby a sheet of plastic film 16 can be clamped therebetween. Gasket means 18 are provided around the edges of the sections 12 and 14 to achieve as much as possible an air-tight enclosure.

The upper section 12 of the apparatus includes a plug assembly 20 which includes a film engaging portion 22 and a base portion 24. A piston 26 is operatively connected to this base portion and this piston is reciprocally movable through the action of the associated cylinder 28. Cooling conduits 30 extend through the top wall of the section 12 and extend throughout the plug portion 22 to thereby maintain this plug portion at a lower temperature than the surroundings.

An inlet 32 is provided for the introduction of heating gases into the space defined by the upper and lower sections. A valve 34 is provided for controlling the flow of gases into this space while an outlet 36 and associated valve 38 complete the structure necessary for circulating a heated gas in contact with the film 16. The valves 34 and 38 are capable of sealing the inlet and outlet whereby superatmospheric pressure can be built-up in the interior of the apparatus.

The build-up of pressure within the apparatus is provided by means of a conduit 40 which extends through the wall of the upper section 12. It will be apparent that with the sections 12 and 14 clamped against the film 16 and with the valves 34 and 38 in their closed positions, the pumping of gas into the space defined by the section 12 will permit the build-up of pressure over the film.

The lower section 14 defines a cavity 42 which ultimately determines the configuration to be assumed by the article to be formed. A cooling conduit 44 is provided within the section 14 adjacent the surfaces of the cavity 42 whereby these surfaces can be maintained at a low temperature for final stiffening of the plastic article when the forming operation has been completed. A gas withdrawing means 46 may be included to assist in the forming of the articles.

Figure 2:
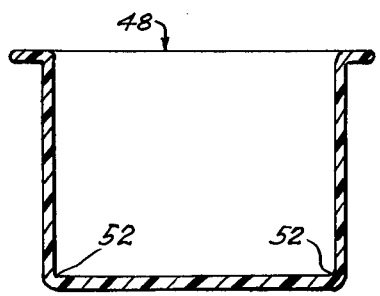
FIGURE 2 is a cross-sectional view of a typical article adapted to be formed by means of the illustrated apparatus.

The operation of the apparatus illustrated in FIGURES 1 and 2 will be described with reference to the forming of cup-shaped member 48 illustrated in FIGURE 2. In the initial stages of the operation, the film 16 is positioned between the sections 12 and 14. It will be understood that individual sheets of film could be employed or the film may be supplied from a continuous sheet.

After clamping of the sheet 16 between the opposing edges of the sections 12 and 14, heated air is introduced through the conduit 32. This heated air passes over the film 16 and out through the outlet 36 and, at this time, the film is caused to assume a desired forming temperature. The particular temperature of the air and the duration of the circulation of the air can be determined depending upon the plastic to be formed and the most suitable temperature for undertaking the forming operation.

When the plastic film has been heated to the desired temperature, the valves 34 and 38 are closed and the plug 22 is lowered whereby it will engage the film 16 and will move the film into the cavity 42. It will be noted that the dimensions of the plug are such that the plug is freely received within the cavity 42 and the film 16 is maintained in spaced-apart relation with respect to the interior surfaces of the cavity.

As a final step in the process, a high relative pressure is built-up over the film 16. This pressure build-up which is preferably undertaken with the use of high pressure air being introduced through the conduit 40 causes the film to move away from the plug 22 and to assume the configuration defined by the mold 42.

Figure 3:
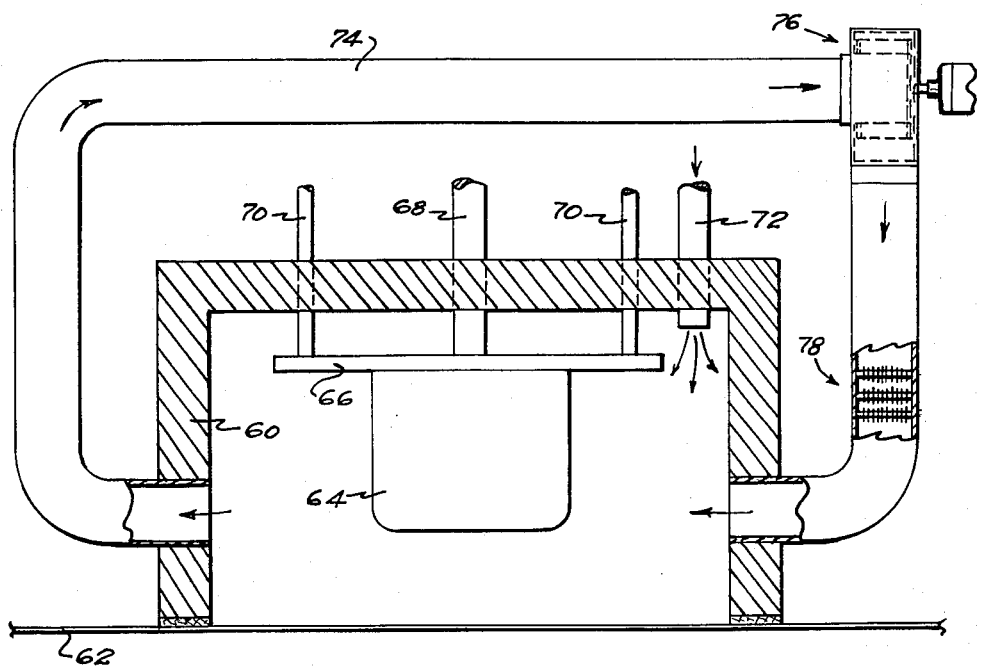
FIGURE 3 is an elevational view in section illustrating the upper section of the apparatus and alternative control means therefor; and, FIGURE 4 is an enlarged fragmentary view of an alternative means for distributing heating air within the apparatus.

The construction illustrated in FIGURE 3 comprises an upper section 60 for use in combination with the plastic sheet 62. A plug 64 mounted on the platen 66 is adapted to be reciprocated in the manner previously described through operation of the piston 68. Cooling conduits 70 are associated with the platen and a source of pressurized gas 72 communicates with the interior of the upper section 60.

A conduit 74 which includes a blower section 76 and a heater section 78 also communicates with the interior of the section 60. In the operation of the device, the sheet 62 is associated between the upper section 60 and a lower section (not shown) in a manner similar to the previously described assembly. Heated air is then circulated over the sheet 62 until the sheet is in a proper condition for forming. The plug 64 is then lowered whereby the sheet will be drawn into the cavity defined in the lower section. Pressure is then exerted by means of the conduit 72 whereby the final configuration of the sheet will be achieved.

It will be appreciated that since the conduit 74 comprises a closed system, there will be no need for providing sealing means when pressure is applied. Thus, the pressure can be built-up within the conduit 74 as well as over the sheet 62. This construction has the advantage of eliminating the need for sealing members within the conduit 74 and, therefore, leakage problems will be minimized.

Figure 4:
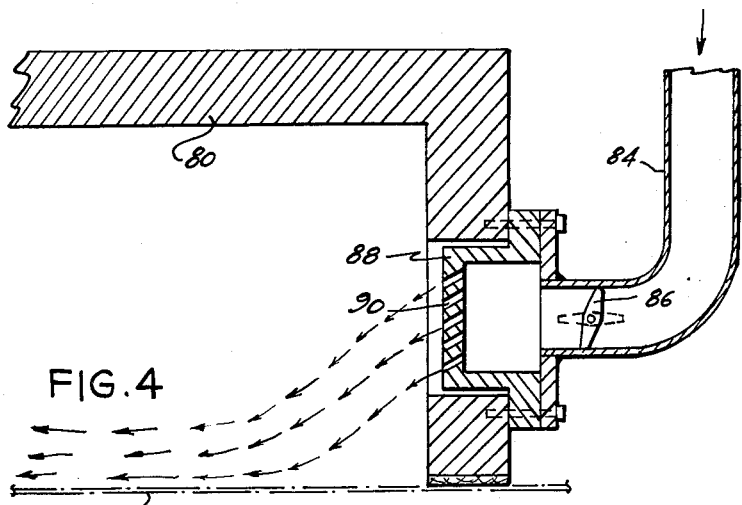

FIGURE 4 illustrates an alternative form of the invention which has been found to be particularly suitable for providing even distribution of heating air over the surface of a plastic sheet. In this construction, an upper section 80 is provided for clamping a plastic sheet 82 in conjunction with a lower section (not shown). The conduit 84 leads to a source of heated gas and this conduit communicates with the section 80 through sealing valve 86. The inlet of the conduit into the section 80 is defined by means of a louvered member 88 which is provided with a plurality of elongated slots 90 extending angularly downwardly toward the surface of the sheet 82. These slots preferably extend substantially completely across the width of the sheet 82.

As suggested in FIGURE 4, the streams of heated air passing from the conduit 84 are forced downwardly into contact with the sheet 82, and it has been found that the air, when directed in this manner, will provide an ideal uniformity insofar as forming conditions are concerned.

The illustrated constructions provide many advantages over existing constructions utilized for the forming of plastic film. In the prior constructions, the plastic film was, in many cases, severely extended in areas which were subjected to relatively high stress under normal handling conditions. This severe extension of the film provided a relatively weaker area, and, accordingly, thick plastic films were resorted to in order to compensate for the expected extension.

With the use of the plug assist of this invention, the film is adapted to be stretched in all areas confined within the edges of the sections 12 and 14. In many previous units without a plug assist, the film would be caused to contact the upper peripheral edge 43 of the mold cavity in the early forming stages and all subsequent stretching occurred in the area of the film situated within these edges. With the plug assist, stretching of the film takes place within the entire area defined by the adjoining edges of the sections 12 and 14. Since a large amount of the film takes part in the stretching, there is a great decrease in the tendency toward extremely thin sections in the ultimate article.

The cooling of the plug 22 also adds to the desirable structural characteristics of an article having a shape similar to the cup 48. This cooling is particularly important with respect to the corners 50 defined by the plug 22. These corners engage the film 16 in the early stages of the lowering of the plug and they tend to stiffen the plastic film in these contacting corners whereby these portions will not stretch as readily as the other warmer portions of the film. The portions initially contacted by the corners 50 eventually form the interior corners 52 of the cup member 48. In the course of normal use, such corners are points of high stress concentration, and, accordingly, there is a greater tendency toward damage in these areas. However, since the cup 48 is characterized by thicker sections of plastic in these areas, the tendency towards damage is substantially reduced. With this arrangement, corners capable of withstanding normal usage can be formed in a cup structure without the need for employing unnecessarily thick plastic film.

As previously noted, it is preferred that superatmospheric pressure be employed above the film 16 in order to press the articles into their final configurations. In this connection, the conduit 46 may be employed to supplement the pressure applying means by providing for exhaust of air from the cavity 42 during the final forming operation.

It will be understood, however, that a vacuum can be applied through a conduit such as the conduit 46 which is associated with the mold cavity 42. Sufficient relative pressure would then be obtained for a large number of forming operations.

It will be apparent that many other changes and modifications can be made in the plastic forming structure of this invention which provide the characteristics of this invention without departing from the spirit thereof particularly as defined in the following claims.

That which is claimed is:

1. An apparatus for the pressure forming of plastic film comprising a mold portion having a film forming cavity therein, means for disposing a plastic film in communication with said cavity, means for sealing said mold portion so as to form an air-tight chamber, means for heating said film within said chamber to a forming temperature, plug means dimensioned to be freely received within said cavity, means for actuating said plug means whereby said film can be disposed in spaced-apart relation with respect to said cavity, and means for applying pressure over said film together with said heating means to cause it to assume the configuration of said cavity.

2. An apparatus in accordance with claim 1 wherein said air-tight chamber comprises first and second separable sections, said molding portion being formed in one of said sections, means for clamping said plastic film between said sections, and valve means in one of said sections to provide for introduction of heated air and to thereby permit heating of said film.

3. An apparatus in accordance with claim 2 wherein said sections define an open interior space above said film and wherein said pressure applying means includes a conduit for introducing air under pressure into said space.

4. An apparatus for the pressure forming of plastic film comprising a mold portion having a film forming cavity therein, means for disposing a plastic film in communication with said cavity, means for sealing said mold portion so as to form an air-tight chamber, means for introducing heated air into contact with said film to thereby heat said film within said chamber to forming temperature, reciprocally mounted plug means dimensioned to be freely received within said cavity, means for actuating said plug means whereby the plug means is adapted to engage said film and to dispose said film in spaced-apart relation with respect to said cavity, and means for applying superatmospheric pressure in combination with said heated air over said film to cause the film to assume the configuration of said cavity.

5. An apparatus in accordance with claim 4 including means for cooling said plug whereby a lesser tendency toward extension is exhibited by portions of the film engaging said plug.

6. An apparatus in accordance with claim 4 including means for cooling the surfaces defining said mold cavity and means for forcing the article formed out of said cavity after cooling of the article by said last mentioned cooling means.

7. An apparatus for the pressure forming of plastic film comprising a mold portion having a film forming cavity therein, means for disposing a plastic film in communication for sealing said mold portion so as to form an air-tight chamber, a conduit having inlet and outlet portions communicating with said apparatus, a blower construction and a heating means fitted within said conduit for circulating heated air into said chamber, said conduit comprising a closed circuit, plug means dimensioned to be freely received within said cavity, means for actuating said plug means whereby said film can be disposed in spaced-apart relation with respect to said cavity, and means for applying superatmospheric pressure over said film to cause it to assume the configuration of said cavity, the added superatmospheric gases becoming part of the closed circuit heating system.

8. An apparatus in accordance with claim 7 wherein said means for heating said film includes a heater and a conduit for passing heated gas from said heater into said apparatus, the outlet for said conduit into said apparatus comprising a louvered member, said member defining a plurality of elongated slots adapted to direct streams of heated gas angularly downwardly into contact with said film.

References Cited by the Examiner
UNITED STATES PATENTS

| | | | |
|---|---|---|---|
| 1,737,874 | 12/1929 | Busch. | |
| 2,123,552 | 7/1938 | Helwig | 18—19 |
| 2,230,189 | 1/1941 | Ferngren | 18—19 |
| 2,493,439 | 1/1950 | Brand | 18—19 X |
| 2,531,539 | 11/1950 | Smith | 18—19 |
| 2,854,694 | 10/1958 | Munford | 18—19 X |
| 2,891,280 | 6/1959 | Politis | 18—19 X |
| 2,912,718 | 11/1959 | Thiel | 18—19 |
| 2,967,328 | 1/1961 | Shelby et al. | 18—18 |
| 2,985,914 | 5/1961 | Miller | 18—19 |
| 2,993,232 | 7/1961 | Hartesveldt | 18—19 |
| 3,007,206 | 11/1961 | Griswald. | |
| 3,011,212 | 12/1961 | Marshall et al. | 264—90 |
| 3,042,969 | 7/1962 | Shaul | 264—90 |
| 3,074,110 | 1/1963 | Mard et al. | 18—19 X |
| 3,121,920 | 2/1964 | Doyle et al. | 18—19 X |
| 3,161,915 | 12/1964 | Thiel | 18—19 |

WILLIAM J. STEPHENSON, *Primary Examiner.*

ALEXANDER H. BRODMERKEL, ROBERT F. WHITE, *Examiners.*

M. R. DOWLING, *Assistant Examiner.*